US009249282B2

(12) United States Patent
Meegan (10) Patent No.: US 9,249,282 B2
(45) Date of Patent: Feb. 2, 2016

(54) CURABLE RESIN COMPOSITION AND SHORT-CURE METHOD (71) Applicant: CYTEC TECHNOLOGY CORP., Wilmington, DE (US)

(72) Inventor: Jonathan E. Meegan, Chester (GB)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 14/686,847

(22) Filed: Apr. 15, 2015

(65) Prior Publication Data

US 2015/0218345 A1 Aug. 6, 2015

Related U.S. Application Data (62) Division of application No. 13/776,754, filed on Feb. 26, 2013, now Pat. No. 9,039,951.

(30) Foreign Application Priority Data

Feb. 27, 2012 (GB) .................................. 1203341.1

(51) Int. Cl.
C08L 63/00 (2006.01)
C08L 63/02 (2006.01)
(Continued)

(52) U.S. Cl.
CPC . *C08K 7/06* (2013.01); *B29C 70/48* (2013.01); *C08G 59/00* (2013.01); *C08G 59/38* (2013.01); *C08G 59/50* (2013.01); *C08G 59/504* (2013.01); *C08G 59/5026* (2013.01); *C08G 59/56* (2013.01); *C08G 65/22* (2013.01); *C08G 85/00* (2013.01); *C08J 3/243* (2013.01); *C08J 3/244* (2013.01); *C08L 63/00* (2013.01);
(Continued)

(58) Field of Classification Search
None
See application file for complete search history.

(56) References Cited

U.S. PATENT DOCUMENTS 6,410,127 B1 * 6/2002 Kamae et al. ............... 428/297.4
2008/0108761 A1 * 5/2008 Kouchi et al. ................. 525/523
2011/0049426 A1 * 3/2011 Patel et al. ............... 252/299.01

FOREIGN PATENT DOCUMENTS

CN 101585957 A 11/2009

OTHER PUBLICATIONS

Machine translation of CN 101585957, provided by Espacenet (no date).*

Primary Examiner — Michael J Feely
(74) Attorney, Agent, or Firm — Thi D. Dang (57) ABSTRACT Disclosed herein is a method for utilizing the exothermic energy generated by a low temperature cure reaction to access a high-temperature cure reaction, which is otherwise energetically inaccessible at a chosen tool temperature, thereby producing a cured resin matrix with properties closely matching to those produced via high-temperature cure reactions but achieved via a short cure time and low cure temperature. Also disclosed is a short-cure resin composition containing: (a) at least one multifunctional epoxy resin having an epoxy functionality of greater than 1; (b) a hardener composition containing (i) at least one aliphatic or cycloaliphatic amine curing agent having one or more amino groups per molecule; (ii) at least one aromatic amine curing agent having one or more amino groups per molecule; and optionally, (iii) an imidazole as curing accelerator. The improved properties of this resin composition include being curable at a temperature of ≤120° C. for a time period of less than 10 minutes to achieve a degree of cure higher than that derived from the same composition with just (i) aliphatic/cycloaliphatic amine or (ii) aromatic amine in isolation.

7 Claims, 3 Drawing Sheets (51) Int. Cl.
  *C08G 59/38* (2006.01)
  *C08G 59/50* (2006.01)
  *C08K 7/06* (2006.01)
  *C08G 65/22* (2006.01)
  *D06M 17/04* (2006.01)
  *C08G 85/00* (2006.01)
  *C08G 59/56* (2006.01)
  *B29C 70/48* (2006.01)
  *C08G 59/00* (2006.01)
  *C08J 3/24* (2006.01)
  *B29C 45/02* (2006.01)
  *C08G 59/24* (2006.01)
  *C08G 59/32* (2006.01)
  *B29K 63/00* (2006.01)
  *B29K 105/08* (2006.01)

(52) U.S. Cl.
  CPC ........... *D06M 17/04* (2013.01); *B29K 2063/00* (2013.01); *B29K 2105/0809* (2013.01); *C08J 2363/00* (2013.01); *Y10T 428/24994* (2015.04); *Y10T 428/31511* (2015.04)

CURABLE RESIN COMPOSITION AND SHORT-CURE METHOD

CROSS-REFERENCE TO RELATED APPLICATIONS

This application is a divisional application of U.S. application Ser. No. 13/776,754, filed on Feb. 26, 2013 (now U.S. Pat. No. 9,039,951), which claims benefit of priority from United Kingdom Patent Application No. 1203341.1, filed Feb. 27, 2012.

BACKGROUND

Thermosetting epoxy resins have been widely used in the production of advanced composite materials, in which reinforcing fibers, such as carbon or glass fibers, are impregnated with a formulation composed of epoxy resins and a curing agent and then cured to form a fiber resin matrix composite material. Reinforced epoxy resin composites having high strength to weight ratios have found extensive use in the aerospace industry and in other applications where high strength, corrosion resistance and light weight are desirable. For instance, fiber resin matrix materials have replaced Aluminium and other metals in primary and secondary structures of modern aircrafts. Sporting equipments such as tennis rackets and golf clubs have also adopted fiber resin materials successfully. Since the advent of fiber resin matrix materials, much effort has been expanded in improving their properties and characteristics, including the development of many different curing systems.

SUMMARY

Disclosed herein is a method for utilizing the exothermic energy (i.e. heat) generated by a low temperature cure reaction to activate a high-temperature cure reaction, which is otherwise energetically inaccessible at the chosen cure temperature. Application of the method results in a cured resin matrix obtained at a tool temperature commensurate with the lower cure temperature (<120° C.) reaction. The tool temperature refers to the temperature of the tool or mould used for curing a resin system.

Also disclosed is a resin composition which contains: (a) at least one multifunctional epoxy resin having an epoxy functionality of greater than 1; (b) at least one aliphatic or cycloaliphatic amine curing agent having one or more amino groups per molecule; (c) at least one aromatic amine curing agent having one or more amino groups per molecule; and optionally, (d) an imidazole as a curing accelerator. The improved properties of this resin composition include being curable at a temperature of equal to or less than 120° C. for a time period of less than 10 minutes, or ≤5 minutes in some embodiments, to achieve greater than 90%, preferably greater than 95%, degree of cure.

DETAILED DESCRIPTION

"Curing" or "cure" is a term that refers to the hardening of a polymer material by the chemical cross-linking of polymer chains. The term "curable" means that the composition is capable of being subjected to conditions which will render the composition to a cured or thermoset state or condition.

The use of aromatic diamine curatives for polyepoxy resins enables the formation crosslinked polymers (thermoset resins) with high glass transition temperature ($T_g$) and generally superior properties when compared to aliphatic amine curatives. However, high cure temperatures, long cure time (typically, 1 to 3 hours), and long post-cure heating are generally required to achieve these higher performance characteristics.

For rapid, low-temperature curing of amine/epoxy systems, aliphatic amines have been used due to the positive inductive effect of the alkyl backbones on the lone pair of electrons located on the amine functionality and the increase in reactivity with epoxy groups that this effect brings in comparison to aromatic amine molecules. However, epoxy formulations containing aliphatic amines are generally unsuitable for curing large volumes of resin at temperatures close to or above the onset of reaction due to their increased reactivity and associated propensity to exotherm.

Imidazoles have been used as accelerators/curing agents in amine-epoxy systems for rapid cure (e.g. less than 1 hour) at temperatures around 100° C. or higher, however, the $T_g$ of the resulting cured resin is typically low, making such resin systems more applicable for adhesive applications. Furthermore, these resin systems also have propensity toward exothermic reaction in the bulk.

Figure 1:
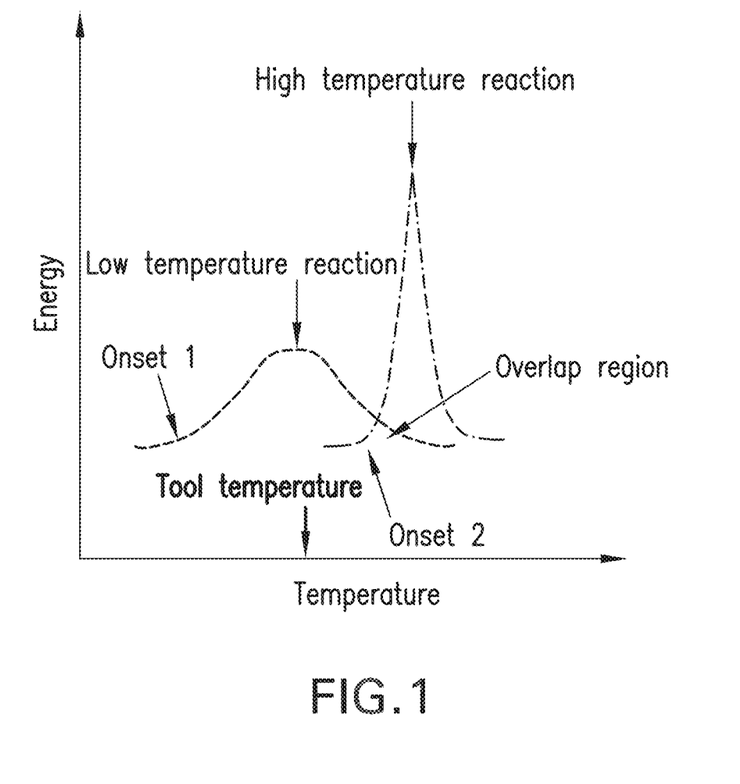
FIG. 1 is a schematic graph illustrating the energy transfer concept of the present disclosure.

It has been discovered that the exothermic energy generated by a curing reaction occurring at low temperature can be used to activate an otherwise energetically inaccessible reaction (which displays a higher cure onset temperature), and that the properties of the resulting cured resin may be influenced by the high temperature cure system rather than being solely representative of the lower curing temperature reaction; this concept is depicted in FIG. 1 the horizontal axis represents the temperature of the tool in which curing takes place, and the vertical axis represents the exothermic energy generated. FIG. 1 shows that the low temperature reaction possesses a lower onset of reaction than the higher temperature reaction, and that the onset of the higher temperature reaction is not initiated by the tool temperature. Instead, the overlap region is used to initiate the higher temperature reaction. High-temperature cure reaction, as used herein, refers to the curing reaction (i.e. cross-linking) of thermoset resin and curing agent initiated by applying heat at a temperature equal to or greater than 130° C. Low-temperature cure reaction refers to curing reaction of thermoset resin and curing agent initiated by applying heat at a temperature within the range of 30° C.-100° C.

A practical method for utilizing the exothermic energy evolved from curing an epoxy resin system has been devised based on the aforementioned energy transfer concept to produce a cured resin matrix with properties influenced by those of high-temperature cure reactions but achieved via a short cure time (<30 minutes, in some instances, <10 minutes) at a cure temperature lower than the onset of the high cure temperature reaction in isolation. This short-cure method includes selecting a specific combination of epoxy resins and curing agents: at least one multifunctional epoxy resin, an aliphatic or cycloaliphatic amine, an aromatic amine, and optionally, an imidazole as curing accelerator. The aliphatic or cycloaliphatic amine curing agent is capable of curing the multifunctional epoxy resin at a low cure temperature. The aromatic amine curing agent is capable of curing the multifunctional epoxy resin at a high cure temperature. The components are then mixed to form a curable resin composition, followed by applying heat to the resin composition in an amount, or a temperature sufficient to initiate the polymerization reaction of the low-temperature cure reaction. During the polymerization phase the low-temperature cure reaction generates exothermic energy, a portion of which is sufficient to initiate the polymerization reaction of high-temperature cure reaction. In the present case, the reaction of epoxy resin, aliphatic or cycloaliphatic amine, and imidazole is the low-temperature cure reaction that generates exothermic energy, and the reaction of epoxy resin, aromatic amine, and imidazole is the high-temperature cure reaction.

According to a preferred embodiment, a short-cure resin composition based on the aforementioned energy transfer concept is composed of (a) at least one multifunctional epoxy resin having an epoxy functionality of greater than 1; and (b) a hardener composition containing two different types of curing agents: (i) at least one aliphatic or cycloaliphatic amine curing agent having one or more amino groups per molecule; (ii) at least one aromatic amine curing agent having one or more amino groups per molecule; and optionally, (iii) an imidazole as curing accelerator.

The short-cure resin composition has a cure onset temperature of less than 100° C., preferably less than 50° C. (e.g. 45° C.) as measured by DSC at a rate of 5° C./minute, and is curable within a temperature range of equal to or less than 120° C., e.g. 110° C.-120° C., for a time period of less than 10 minutes (≤5 minutes in some embodiments, ≤3 minutes in other embodiments) to achieve a degree of cure higher than that derived from the same composition with just (i) aliphatic/cycloaliphatic amine or (ii) aromatic amine in isolation. When this short-cure resin composition is used for resin infusion in a mold to impregnate a fiber reinforcement material, e.g. via a Resin Transfer Molding (RTM) process, greater than 95% degree of cure, or greater than 97% degree of cure, can be achieved after less than 5 minutes of curing (e.g. 3 minutes) at 120° C. or less. The degree of cure as discussed herein is measured by DSC at the rate of 5° C./minute.

Upon curing for less than 10 minutes (≤5 minutes in some embodiments) at a curing temperature of 120° C. or less, the short-cure resin composition yields a cured resin matrix with a glass transition temperature ($T_g$) within the range of 110° C.-150° C., or 115° C.-120° C., as measured by DSC. The cured resin matrix is a chemically homogenous network phase.

The resin composition discussed above enables a short-cure time in combination with relatively low cure onset temperature. These desirable properties within this short-cure resin composition relates to using the second higher temperature cure reaction to absorb exothermic energy from the first lower temperature cure reaction as illustrated in FIG. 1.

Figure 2:
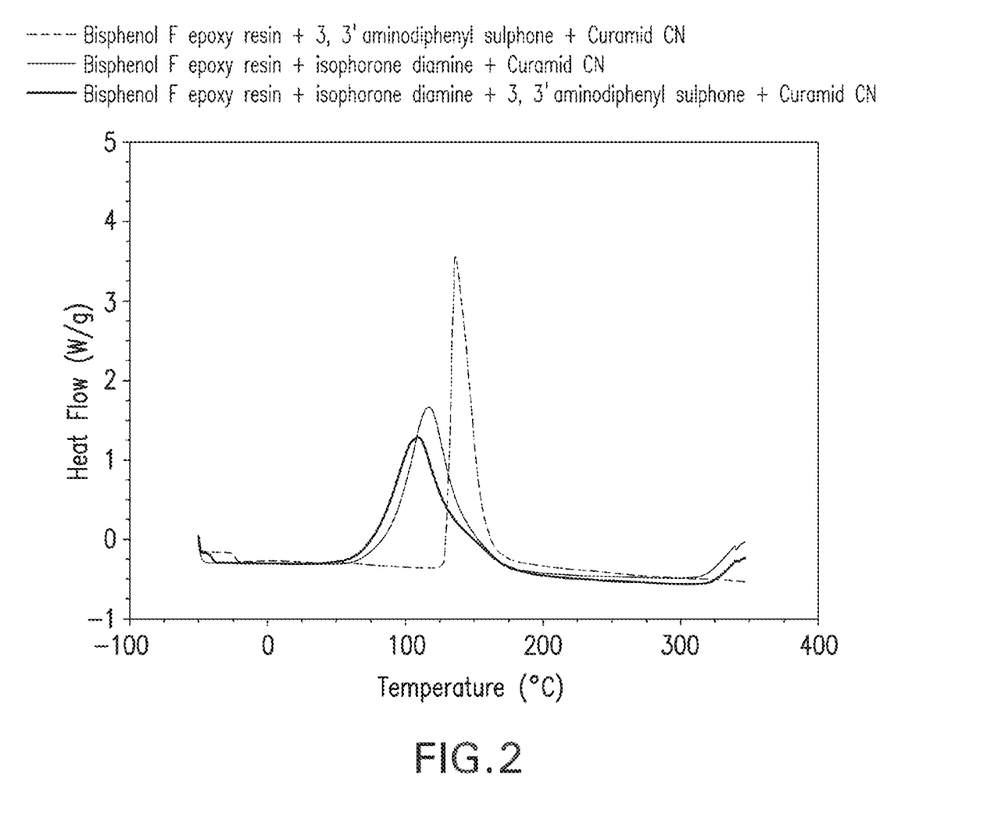
FIG. 2 is an exemplary embodiment of the concept described in FIG. 1.

An exemplary embodiment of the energy transfer concept described above is shown in FIG. 2. FIG. 2 shows the DSC traces for the reactivity of bisphenol F epoxy resin and isophorone diamine (a low temperature reaction) and the reactivity of bisphenol F epoxy resin and 3,3'-aminodiphenylsulphone (a high temperature reaction). Isophorone diamine is a cycloaliphatic amine, and 3,3'-aminodiphenylsulphone is an aromatic amine. The traces for low temperature reaction and high temperature reaction closely match the concept described in FIG. 1. The third trace shows an equimolar combination of isophorone diamine and 3,3'-aminodiphenylsulphone in a stoichiometric balance with bisphenol F epoxy resin and illustrates that the two cure agents in combination have a surprising and desired effect.

Epoxy Resins

As used herein, the term "multifunctional epoxy resin" refers to a compound having an epoxy functionality of greater than one, and capable of being cured to a polymeric state. The epoxy resins suitable for use in the present disclosure are polyepoxide compounds having more than one epoxide group per molecule available for reaction with the amine curing agents. In general, the multifunctional resins may be saturated, unsaturated, cyclic or acyclic, aliphatic, alicyclic, aromatic or heterocyclic molecules with epoxy functionality. Suitable multifunctional epoxy resins, by way of example, include those based upon: phenol and cresol epoxy novolacs, glycidyl ethers of phenolaldelyde adducts; glycidyl ethers of dialiphatic diols; diglycidyl ether; diethylene glycol diglycidyl ether; aromatic epoxy resins; dialiphatic triglycidyl ethers, aliphatic polyglycidyl ethers; epoxidised olefins; brominated resins; aromatic glycidyl amines; heterocyclic glycidyl imidines and amides; glycidyl ethers; fluorinated epoxy resins.

Examples of suitable epoxides include polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)methane), bisphenol S, bis(4-hydroxyphenyl)-1,1-isobutane, fluorene 4,4'-dihydroxybenzophenone, bis(4-hydroxyphenyl)-1,1-ethane, bisphenol Z (4,4'-Cyclohexylidenebisphenol), and 1,5-hydroxy-naphthalene. Also suitable are the polyglycidyl ethers of polyalcohols, aminophenols or aromatic diamines.

Additional examples include: polyglycidyl ethers of polyvalent phenols, for example pyrocatechol; resorcinol, hydroquinone; 4,4'-dihydroxydiphenyl methane; 4,4'-dihydroxy-3,3'-dimethyldiphenyl methane; 4,4'-dihydroxydiphenyl dimethyl methane; 4,4'-dihydroxydiphenyl methyl methane; 4,4'-dihydroxydiphenyl cyclohexane; 4,4'-dihydroxy-3,3'-dimethyldiphenyl propane; 4,4'-dihydroxydiphenyl sulfone; or tris(4-hydroxyphenyl)methane; polyglycidyl ethers of the chlorination and bromination products of the abovementioned diphenols; polyglycidyl ethers of novolacs (i.e., reaction products of monohydric or polyhydric phenols with aldehydes, formaldehyde in particular, in the presence of acid catalyst).

Further examples of epoxy resins include diglycidyl ethers of diene-modified phenolic novolacs, the reaction products of polyfunctional cycloaliphatic carboxylic acids with epichlorohydrin, cycloaliphatic epoxides, cycloaliphatic epoxy ethers and cycloaliphatic epoxy esters, and the like.

Suitable multifunctional epoxy resins may include di-functional, tri-functional, and tetra-functional epoxies, in any combination. Examples of di-functional epoxy resins include digylcidyl ethers of bisphenol A (e.g. Epon™ 828 (liquid epoxy resin), DER 331, DER 661 (solid epoxy resin) from Dow Chemical Co., EJ-190 from by Dyne Chemical Co., Tactix 123 from Huntsman Advanced Materials), digylcidyl ethers of bisphenol F (DGEBF) (e.g., PY306 from Huntsman Advanced Materials, Epikote™ 158 (from Momentive). Examples of tri-functional epoxy resins include triglycidyl ether of aminophenol, e.g. Araldite® MY 0510, MY 0500, MY 0600, MY 0610 supplied by Huntsman Advanced Materials. Examples of tetra-functional epoxy resins include tetraglycidyl ether of methylene dianiline (e.g. Araldite® MY 9655 from Huntsman Advanced Materials), tetraglycidyl diaminodiphenyl methane (e.g., Araldite® MY 721, MY 720, MY 725, MY 9663, MY 9634, MY 9655 supplied by Huntsman Advanced Materials).

Particularly suitable are multifunctional epoxy resins having functionality based on glycidyl amine or glycidyl ether, or both. Multifunctional epoxy resins having both glycidyl amine and glycidyl ether functional groups are more preferable. In certain embodiments, the multifunctional epoxy res- ins for the short-cure resin composition disclosed herein may be selected from a group of epoxies represented by the following structures:

Methylene bis(N,N-diglycidyl aniline) (I)

Bisphenol F diglycidyl ether (II)

Triphenylolmethane triglycidyl ether (III)

4-glycidyloxy-N,N-diglycidylaniline (IV)

3-glycidyloxy-N,N-diglycidylaniline (V)

Note that Structure (I) contains glycidyl amine functional group, Structures (II) and (III) contain glycidyl ether functional group, and Structures (IV) and (V) contain both glycidyl amine and glycidyl ether functional groups.

Curing Agents and Accelerators

Suitable aliphatic or cycloaliphatic amine curing agents are those having amine-hydrogen functionality of greater than 1 and are capable of curing the multifunctional epoxy resin at a temperature within the range of 30° C.-100° C. Exemplary aliphatic amines include, but are not limited to: triethylamine, diethylamine, triethylenetetramine (TETA), diethyltoluenediamine (DETDA), polyether amines (e.g. those commercially available from Huntsman Corp. under the trademark Jeffamine). Exemplary cycloaliphatic amines include, but are not limited to: isophorone diamine, menthane diamine, 1,2-diaminocyclohexane, 1,3-diaminocyclohexane, 1,4-diaminocyclohexane, 1,3-di(aminomethyl)cyclohexane, 4,4'-methylene dicyclohexylamine, 4,4'-diaminodicyclohexylmethane, 3,3'-dimethyl-4,4'diaminodicyclohexyl-methane, and combinations thereof Suitable aromatic amine curing agents are those having an amine-hydrogen functionality of greater than 1 and are capable of curing said multifunctional epoxy resin at a temperature of 120° C. or greater, more preferably 130° C. or greater. Exemplary aromatic amines include, but are not limited to: 3,3'-diaminodiphenylsulphone (3,3'DDS), 4,4'-diaminodiphenylsulphone (4,4'DDS); 4,4'-methylene-bis-(3-chloro-2,6-diethylaniline) (MCDEA); 4,4'-methylene-bis-(2,6-diethylaniline) (MDEA); 2,6-diethylaniline (DEA); dianiline such as methylenedianiline (MDA), 9,9-Bis(3-chloro-4-aminophenyl)-9H-fluorene (CAF).

Imidazole in combination with at least one of the aliphatic and aromatic amine cure agents discussed above has been found to cause an earlier cure onset temperature and to enhance reactivity. Suitable imidazole accelerators include, but are not limited to imidazole, methyl imidazole, ethyl methyl imidazole, ethylmethylimidazoleproprionitrile, cyanoethylphenylbismethylimidazole Preparation of Resin Composition In general, the curable resin composition based on the energy transfer concept of the present disclosure is prepared by mixing one or more epoxy resins with a hardener composition containing amines, and optionally, imidazole. The preparation of the hardener composition may include the application of heat to dissolve the aromatic amine in the aliphatic amine followed by cooling prior to adding the imidazole. The epoxy resin(s) may be pre-heated as necessary to lower its viscosity prior to mixing it with the amines. The stoichiometry of the epoxy-amine mixture is based on an equivalent ratio of amine groups to epoxy groups of 0.1:2, preferably 1:1. The weight ratio of aromatic amine to aliphatic amine may be varied, depending on the amines selected, to achieve the desired stoichiometric ratio. Imidazole may be present in amount of less than 2.0% by weight based on the total weight of the resin composition.

In one embodiment, the short-cure resin contains 100 parts of multifunctional epoxy resin(s), 10-90 parts of curing agent mixture, and 0-10 parts imidazole.

Application

The curable resin composition, as described above, is suitable for impregnating (or infusing) fiber reinforcements using conventional resin infusion techniques to form composite materials and structures. The disclosed resin composition is particularly suitable, but not limited to, 2-part resin transfer molding (RTM), in which a low-viscosity resin system is important. RTM is a process by which a low-viscosity resin composition is introduced into a closed mold which contains a dry fiber preform. The fiber preform is composed of reinforcement fibers, which may take the form of layers of continuous fibers or woven fabric. The fiber preform may be shaped into a desired three-dimensional configuration suitable for fabrication of a composite part. The resin composition may be prepared by combining part A (epoxy resin composition) and part B (hardener composition). The formulated and premixed resin composition is then injected into the mold which is maintained under low pressure or under vacuum. Low resin viscosity at the injection temperature is desirable to obtain the optimum mold filling and fiber wetting. After the mold is filled, it is heated in accordance with the appropriate cure schedule. The resulting molded part can then be removed from the mold and post-cured as necessary. In order to achieve good fiber infusion and low void content during RTM processing, resin viscosity below about 1 Poise at the injection temperature of about 50-100° C. is highly desired. Further, the resin system must maintain this low viscosity for a period of time sufficient to completely fill the mold and infuse the fiber preform. For RTM processing, such time is frequently measured in terms of the pot life of the resin, which can be defined as the time required for the resin to reach 5 Poise.

Reinforcement fibers for manufacturing composite structures may take the form of continuous fibers, chopped fibers, or woven fabric. The fiber material may be selected from, but is not limited to, carbon, graphite, aromatic polyamide (Kevlar), poly(benzothiazole) and poly(benzimidazole), poly(benzoxazole) (PBO), alumina, titania, quartz, glass, aramid, polyethylene, polyester, silicon carbide, and combinations thereof. The selection of the fiber reinforcement type is determined by the performance requirements for the composite structure. For many aircraft applications where high strength and low weight are critical, high-modulus carbon or graphite fibers are the preferred reinforcements.

The relative proportions of fiber reinforcement and resin matrix within the composite material may be varied, as dictated by the intended application. In one embodiment for advanced composite applications, the weight fraction of the fiber reinforcement present within the composite may range between about 50% to 70% by weight, preferably 69%, on the basis of the total weight of the composite.

One or more functional additives may be added to the curable resin composition prior to resin infusion in order to impart certain properties to the uncured composition or to the cured composite structure. The functional additives may be added to influence one or more of mechanical, rheological, electrical, optical, chemical, flame resistance and/or thermal properties of the cured or uncured epoxy composition. Examples of additives may include, but are not limited to, flame retardants, ultraviolet (UV) stabilizers, inorganic fillers, conductive particles or flakes.

EXAMPLES

The following non-limiting examples are illustrative of the short-cure method and resin composition based on the aforementioned energy transfer concept and are not to be construed as limiting the scope thereof in any manner.

Example 1

Five formulations were prepared as disclosed in TABLE 1 and analyzed using differential scanning calorimetry. Formulation 5 encompasses the energy-transfer concept discussed above. In Table 1, PY306 is Bisphenol F diglycidyl ether, CN or Curamid CN is 2-Ethyl-4-methyl-1H-imidazole-1-propanenitrile (a curing accelerator), 3,3'DDS is 3,3'diaminodiphenylsulphone (an aromatic amine), IDA is Isophorone Diamine (an aliphatic amine). All amounts are expressed in grams.

TABLE 1

| | Formulations | | | | |
| --- | --- | --- | --- | --- | --- |
| Components | 1<br>3,3'DDS | 2<br>IDA | 3<br>3,3'DDS +<br>CN | 4<br>IDA + CN | 5<br>3,3'DDS +<br>IDA + CN |
| PY306 | 13.3 | 13.3 | 13.3 | 13.3 | 16 |
| 3,3'DDS | 5.3 | 0 | 5.3 | 0 | 5 |
| IDA | 0 | 4.1 | 0 | 4.1 | 1.5 |
| Curamid CN | 0 | 0 | 0.2 | 0.2 | 0.2 |

The formulations were analyzed using DSC (TA Instruments Q2000) and the results are shown in Table 2.

TABLE 2

| | Formulations | | | | |
| --- | --- | --- | --- | --- | --- |
| Measurements | 1<br>3,3'DDS | 2<br>IDA | 3<br>3,3'DDS +<br>CN | 4<br>IDA +<br>CN | 5<br>3,3'DDS +<br>IDA + CN |
| Cure onset (° C.) | 145 | 68 | 118 | 63 | 45 |
| Integral of cure peak (J/g) | 597 | 434 | 422 | 518 | 513 |
| DSC derived exothermic energy released after 3 min 120° C. cure cycle (J/g) | 220 | 185 | 98.7 | 193 | 55 |
| Integral of residual cure peak in material after 3 min 120° C. cure | 458 | 121 | 156 | 109 | 71 |
| Degree of cure after 3 minutes at 120° C. (%) | 23 | 72 | 63 | 79 | 87 |
| DSC midpoint $T_g$ after 3 minutes at 120° C. | −12 | 60 | 36 | 60 | 70 |

As can be seen from Table 2, Formulation 5 has the lowest cure onset temperature and produced significantly less exothermic energy during a 5-minute cure as compared to the other formulations.

Example 2

A short-cure resin composition was prepared based on the formulation disclosed in TABLE 3.

TABLE 3

| Formulation | Amounts (g) |
| --- | --- |
| Diglycidyl ether of bisphenol F (DGEBF) | 13.3 |
| Triglycidyl m-aminophenol | 4 |
| Isophorone Diamine | 5 |
| 3,3' DDS | 1.5 |
| Imidazole | 0.2 |

The formulation was split into two parts, part A contained the epoxy components and part B contained the amine and imidazole components. Part A was prepared by warming DGEBF (70° C.) until a clear fluid was obtained. Triglycidyl m-aminophenol (room temperature) was added to this fluid and the components mixed until homogenous using an air line. Part B was prepared by dissolving 3,3'DDS into Isophorone Diamine (80° C.) with stirring, the mixture was allowed to cool to room temperature before imidazole was added.

Part A and part B were degassed separately (30° C., −1 atm) for 15 minutes prior to being combined together in a mass ratio of 2.2:1 (A:B) using air line stirring to achieve homogeneity. The mixture was then quickly degassed again to remove air introduced during the degas phase (30° C., −1 atm). 10 g of the combined Parts A and B was transferred to an Aluminium dish and heating was carried out for 5 minutes in an oil bath (110° C.), after which the dish was removed and allowed to cool to room temperature.

For comparison, cured resin samples were prepared using commercially available RTM epoxy resins: CYCOM 890, CYCOM 823, PRISM EP2400. The cured resin samples were then characterized using the following test methods/instruments:

| Test | Method/Instrumentation | |
| --- | --- | --- |
| DSC (Deg. of Cure, exothermic energy) | TA Instruments Q2000 | 5° C. ramp from −50 to 250° C. |
| Resin Flexural Modulus and Strength | ASTM D790 | Tested to break |
| Resin Tensile Modulus and Strength | ASTM D638 | |

The results are shown in Table 4.

TABLE 4

| Test | Short-Cure Resin | CYCOM 890 | CYCOM 823 | PRISM EP2400 |
| --- | --- | --- | --- | --- |
| Flexural Modulus (GPa) | 4.09 | 3.6 | 3.2 | 3.4 |
| Flexural Strength (MPa) | 158 | 164 | 139 | 144 |
| Tensile Modulus (GPa) | 3.92 | 3.4 | 3.1 | 2.9 |
| Tensile Strength (MPa) | 79.29 | 95 | 70 | 80 |
| Degree of Cure (%) | 95 | 97.5 | 97.5 | 97.5 |
| Cure temp (° C.) | 110 | 180 | 180 | 120 |
| Cure time (min) | 5 | 120 | 120 | 60 |

These results show that the short-cure resin can achieve comparable mechanical properties relative to the other commercial resin systems in a much shorter cure time of 5 minutes.

Example 3

A short-cure formulation was prepared as detailed in TABLE 5.

TABLE 5

| Formulation | Amounts (g) |
| --- | --- |
| Diglycidyl ether of bisphenol F (DGEBF) | 13.3 |
| Triglycidyl m-aminophenol | 4 |
| Isophorone Diamine | 5 |
| 3,3' DDS | 1.5 |
| Imidazole | 0.2 |

TABLE 6 shows trial runs in which greater than 95% degree of cure was achieved within 2-3 minute cure time.

TABLE 6

| Run | Curing temperature (° C.) | Mixing temperature (° C.) | Cure time (seconds) | Mix ratio (A:B) |
| --- | --- | --- | --- | --- |
| 1 | 120 | 100 | 120 | 1:1 |
| 2 | 120 | 100 | 180 | 1:0.8 |
| 3 | 110 | 50 | 180 | 1:1 |
| 4 | 110 | 75 | 120 | 1:1 |
| 5 | 120 | 50 | 120 | 1:1 |
| 6 | 120 | 50 | 180 | 1:1.2 |
| 7 | 120 | 75 | 120 | 1:0.8 |

For each run, Part A and Part B were prepared based on the resin formulation shown in TABLE 5. Part A was prepared by mixing pre-heated PY306 (70° C.) with MY0610 at room temperature using an air line until a visually homogenous mixture had been obtained. Part B was prepared by dissolving 3,3' DDS in Isophorone Diamine (IDA) (80° C.) for 10 minutes until dissolved. The mixture was then cooled to 50° C. before 0.2 g imidazole was added with stirring to distribute.

Part A and Part B were degassed at room temperature prior to being combined based on the ratio and mixing temperature disclosed in Table 6. 10 g of the combined Parts A and B was transferred to an aluminum dish, and heating was carried out in an oil bath according to the curing temperature disclosed in Table 6, and then the cure time was recorded.

Example 4

Resin from Example 3 was taken and introduced into a carbon fibre preform made of 12 k IMS65 Unidirectional fibres, and having an areal weight of 196 gsm, via High Pressure RTM processing, using a cure cycle of 3 minutes at 120° C. to yield a laminate with a volume fraction of 49%.

For comparison, the same laminate was prepared using CYCOM 977-2 epoxy-based resin (available from Cytec Engineered Materials Inc.) and a cure cycle of 180° C. for 3 hrs. The characteristics of the two laminates, normalized to 50% are summarized in FIG. 3.

Figure 3:
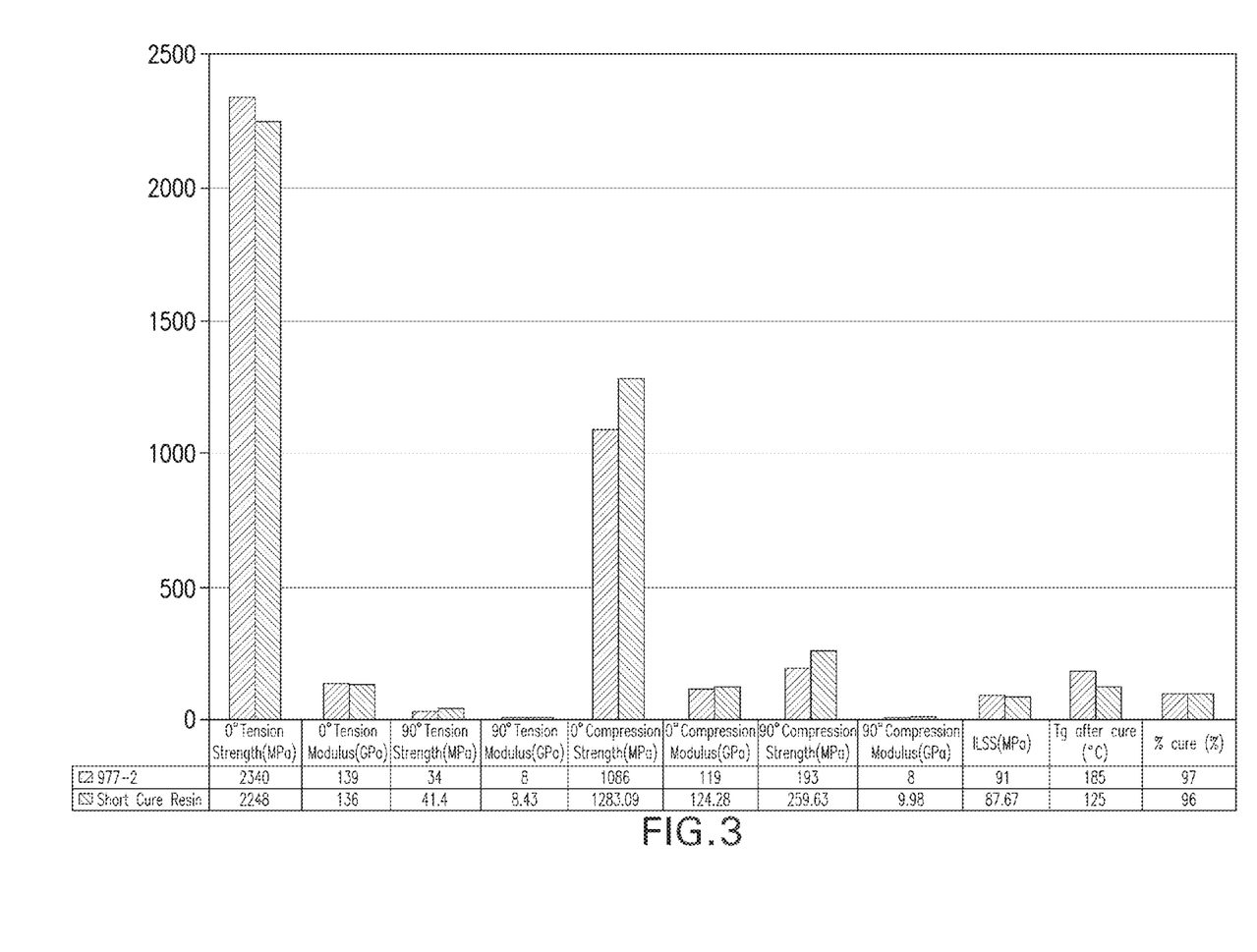
FIG. 3 shows selected mechanical test data for two composite laminates described in an example.

These results show that the mechanical performance of the carbon fiber laminate derived from the short cure resin is comparable with that of the resin system known to be used in high performance aerospace applications and typically cured using a significantly longer cure time and higher cure temperature.

What is claimed is:

1. A curable epoxy resin composition having a viscosity suitable for Resin Transfer Molding (RTM), said composition comprising:
   (a) at least one multifunctional epoxy resin having an epoxy functionality of greater than 1 and that functionality is based on glycidyl amine, or glycidyl ether, or both;

(b) a hardener composition comprising:
   (i) at least one aliphatic or cycloaliphatic amine curing agent having one or more amino groups per molecule and capable of individually initiating a curing reaction of said at least one multifunctional epoxy resin at a cure onset temperature within the range of 30° C.-100° C. and selected from the group consisting of: isophorone diamine, triethylamine, diethylamine, triethylenetetramine (TETA), and polyether amines;
   (ii) at least one aromatic amine curing agent having one or more amino groups per molecule and capable of individually initiating a curing reaction of said at least one multifunctional epoxy resin at a cure onset temperature of 120° C. or greater and selected from the group consisting of: 3,3' diaminodiphenylsulphone, 4,4' diaminodiphenylsulphone; 4,4'-methylene-bis-(3-chloro-2,6-diethylaniline) (MCDEA), 4,4'-methylene-bis-(2,6-diethylaniline) (MDEA), 2,6-diethylaniline (DEA), and dianiline; and
   (iii) an imidazole as curing accelerator,
wherein, per 100 parts of multifunctional epoxy resin (a), the amount of the curing agents (i) and (ii) is 10-90 parts, and the amount of imidazole (iii) is up to 10 parts, and
wherein said epoxy resin composition is curable at a temperature below the cure onset temperature of the aromatic amine curing agent for a time period of less than 5 minutes to achieve a degree of cure of 95% or higher.

2. The curable epoxy resin composition of claim 1, wherein the hardener composition comprises isophorone diamine and either 3,3'-diaminodiphenylsulphone or 4,4' diaminodiphenylsulphone.

3. The curable epoxy resin composition of claim 1, wherein the at least one multifunctional epoxy resin comprises a combination of a di-functional epoxy resin and a tri-functional or tetra-functional epoxy resin.

4. The curable epoxy resin composition of claim 1, wherein equivalent ratio of amine groups to epoxy groups in the composition is 1:1.

5. The curable epoxy resin composition of claim 1, wherein the multifunctional epoxy resin is selected from a group consisting of:

6. The curable epoxy resin composition of claim 1, wherein the multifunctional epoxy resin contains both glycidyl amine and glycidyl ether functional groups.

7. The curable epoxy resin composition of claim 1, wherein the aliphatic or cycloaliphatic amine curing agent is isophorone diamine.

* * * * *